United States Patent

Emerson et al.

[11] Patent Number: 5,151,022
[45] Date of Patent: Sep. 29, 1992

[54] ENVIRONMENTAL CONTROL SYSTEM WITH CATALYTIC FILTER

[75] Inventors: Terence P. Emerson, Hermosa Beach; Frank A. Bescoby, Rancho Palos Verdes; Colin M. Taylor, Lakewood, all of Calif.; George K. Payne, Baldwin, Ga.

[73] Assignee: Allied-Signal Inc., Morris Township, Morris County, N.J.

[21] Appl. No.: 771,699

[22] Filed: Oct. 3, 1991

[51] Int. Cl.5 .............................. F24F 11/00
[52] U.S. Cl. .................. 423/245.3; 62/401; 62/215; 55/23; 55/80; 55/267
[58] Field of Search .............. 62/401, 402, 215, 86, 62/78, 455; 423/219, 245.3; 55/23, 69, 80, 97

[56] References Cited

U.S. PATENT DOCUMENTS

| | | |
|---|---|---|
| 1,660,269 | 2/1928 | Knox et al. . |
| 2,526,103 | 10/1950 | Wood . |
| 2,696,975 | 12/1954 | Massey et al. . |
| 2,777,301 | 1/1957 | Kuhn . |
| 2,784,571 | 3/1957 | Schelp . |
| 3,623,332 | 11/1971 | Fernandes . |
| 3,713,294 | 1/1973 | Balje .................. 62/402 X |
| 3,877,246 | 4/1975 | Schutze . |
| 3,883,637 | 5/1975 | Benedict . |
| 4,198,830 | 4/1980 | Campbell . |
| 4,200,442 | 4/1980 | Willot . |
| 4,262,495 | 4/1981 | Gupta et al. . |
| 4,283,924 | 8/1981 | Schutze . |
| 4,312,191 | 1/1982 | Biagini . |
| 4,334,411 | 6/1982 | Payne . |
| 4,347,714 | 9/1982 | Kinsell et al. . |
| 4,374,469 | 2/1983 | Rannenberg . |
| 4,444,018 | 4/1984 | Kinsell et al. . |
| 4,444,021 | 4/1984 | Kinsell et al. . |
| 4,445,639 | 5/1984 | Kinsell et al. . |
| 4,531,379 | 7/1985 | Diefenthaler, Jr. . |
| 4,535,606 | 8/1985 | Rannenberg . |
| 4,550,573 | 11/1985 | Rannenberg . |
| 4,553,407 | 11/1985 | Rannenberg . |
| 4,655,049 | 4/1987 | Andrews .................. 62/401 X |
| 4,665,973 | 5/1987 | Limberg et al. . |
| 4,732,579 | 3/1988 | Veltman et al. . |
| 4,756,359 | 7/1988 | Greer . |
| 4,762,170 | 8/1988 | Nijjar et al. . |
| 4,824,363 | 4/1989 | Abthoff et al. . |
| 4,829,775 | 5/1989 | Defrancesco . |

Primary Examiner—Alan Cohan
Attorney, Agent, or Firm—Jerry J. Holden; James W. McFarland; Robert A. Walsh

[57] ABSTRACT

An environmental control system for ground vehicles and low flying aircraft that supplies purified and conditioned ambient air to the vehicle's crew compartment is provided. The system integrates catalytic and particulate filters, that remove nuclear, biological, and chemical warfare agents from ambient air, with a source of compressed ambient air, and an air cycle refrigeration unit.

19 Claims, 2 Drawing Sheets

ENVIRONMENTAL CONTROL SYSTEM WITH CATALYTIC FILTER

TECHNICAL FIELD

This invention pertains to environmental control systems for ground vehicles and low flying aircraft that supplies purified and conditioned ambient air to the vehicle's crew compartment, and more specifically to an environmental control system that integrates catalytic and particulate filters for removing nuclear, biological, and chemical warfare agents from ambient air with a source of compressed ambient air, and an air cycle refrigeration unit.

BACKGROUND OF THE INVENTION

Veltman et al., U.S. Pat. No. 4,732,578 discloses an air purification and temperature control system for combat vehicles that incorporates a pressure swing adsorbent system for filtering nuclear, biological and chemical warfare agents. This adsorbent system is comprised of two tanks each of which has an adsorbent bed. As described in column 4, lines 5-45 of Veltman compressed air from the control system enters the first tank through a four way inlet purge valve. Water, hydrocarbons, and chemical agents are adsorbed in the bed and purified so that dry air exits the tank. A portion of the purified air is expanded through an orifice an then passed through the second tank in the direction opposite the flow in the first tank. This flow purges contaminants from the adsorbent bed in the second tank, and is then dumped over board. After a period of time the process is reversed and the second tank receives the compressed air and the first tank is purged.

The Applicants have found that pressure swing adsorbent systems have a number of disadvantages. First, the portion of air required for purging can be as large as half of the air entering the system. By dumping this purging air over board a large amount of energy is lost reducing the system's overall efficiency. Second, if the temperature differential between the air entering the system and the purge air becomes too large, the adsorbent system ability to purify the air starts to degrade.

Accordingly, a need exists for an environmental control systems for ground vehicles and low flying aircraft, that includes a means for filtering nuclear, biological, and chemical warfare agents that does not have the deficiencies associated with pressure swing adsorbent systems.

SUMMARY OF THE INVENTION

An object of the present invention is to provide an environmental control system that integrates a source of pressurized ambient air, a catalytic filter, a particulate filter and an air cycle refrigeration unit.

Another object of the present invention is to provide a method for providing clean air at a desirable temperature free of nuclear, biological and chemical warfare agents to the compartment of a ground vehicle or low flying aircraft.

The present invention achieves the above-stated objects by providing an environmental control system for mounting aboard a ground vehicle or aircraft that integrates a source of compressed ambient air, a catalytic filter, a particulate filter and a refrigeration unit.

These and other objects, features and advantages of the present invention are specifically set forth in or will become apparent from the following detailed description of a preferred embodiment of the invention when read in conjunction with the accompanying drawing.

DESCRIPTION OF THE PREFERRED EMBODIMENT

Figure 1:
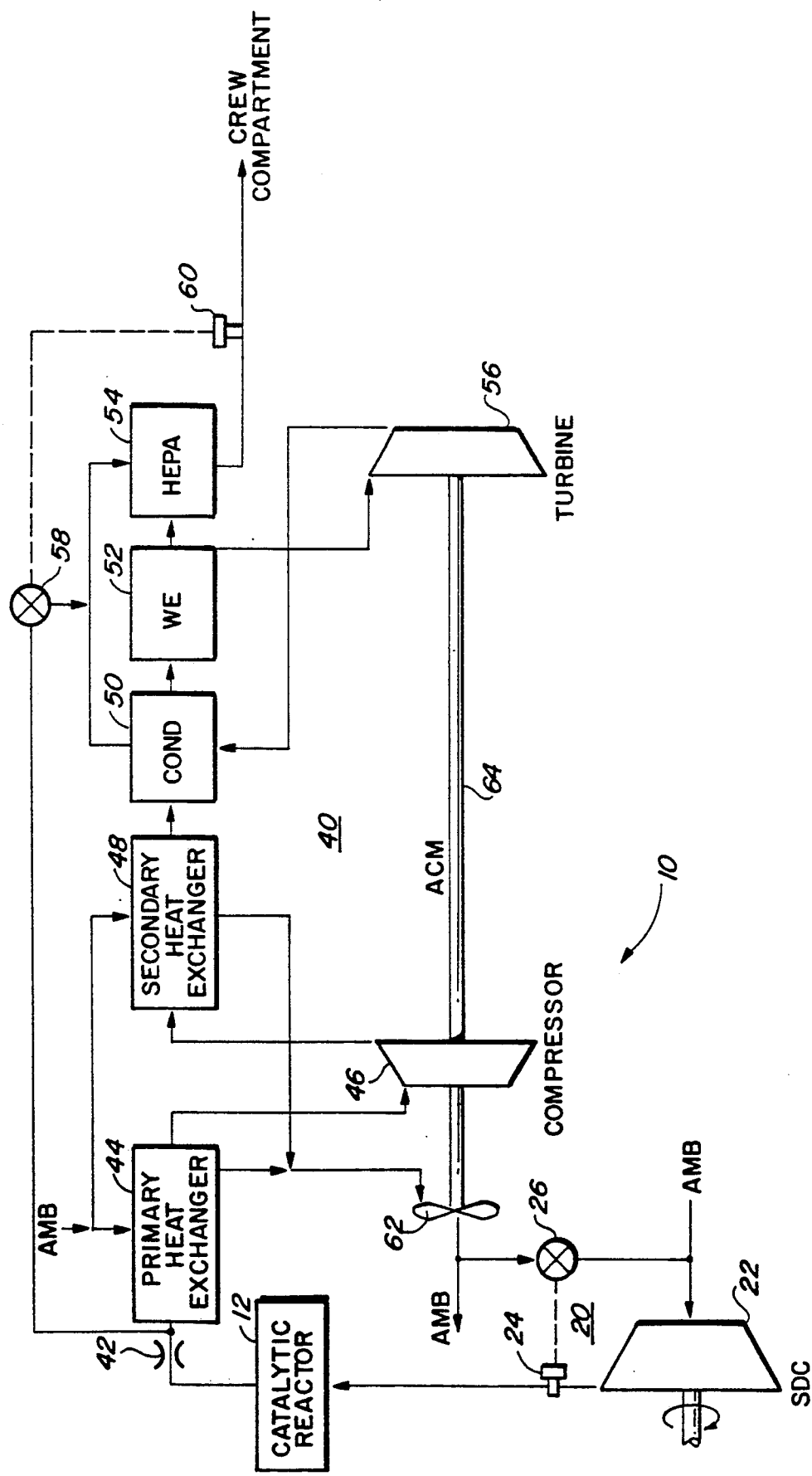
FIG. 1 is a schematic of one embodiment of the environmental control system contemplated by the present invention.

An environmental control system, generally denoted by the reference numeral 10, is schematically depicted in FIG. 1. Integrated within the system 10 are a catalytic filter 12, a source of compressed ambient air 20, and an air-cycle refrigeration unit 40.

In the following, the refrigeration unit 40 is described as a three-wheel, boot strap type unit, however, as one of ordinary skill in the art would appreciate a two-wheel bootstrap unit or a simple cycle unit is interchangeable with the three-wheel unit within the system 10.

High pressure and high temperature air enters the refrigeration unit 40 through a venturi 42 which is sized to be not quite choked when the refrigeration unit 40 is running on a hot day. This air passes through a primary, air-to-air heat exchanger 44 which employs ambient air as the heat sink. Within the heat exchanger 44 the air is cooled to near ambient temperature with very little pressure drop. The air exits the heat exchanger 44 and enters a compressor 46 where it is pressurized and heated. The reheated air is again cooled, with only a slight pressure drop, to a temperature near ambient in a secondary, air-to-air heat exchanger 48 which also uses ambient air as a heat sink.

At this point the processed air is at a pressure level above its inlet pressure and is at a temperature near ambient. This air is then passed through a condenser 50 where it is cooled while undergoing only a slight pressure drop which results in condensation of almost all the moisture that may have been in the air stream. This condensed moisture is mechanically removed from the air stream by a water extractor 52 which centrifuges the water droplets out of the air stream and then drains the water.

The cooled, dried air exiting the water extractor 52 then passes to an expansion turbine 56 in which the air is expanded to near atmospheric pressure and further cooled to well below ambient temperature. This cold air is circulated through the condenser 50 where it is used to cool the turbine inlet air and is heated in return. This air than passes through a high efficiency particulate air (HEPA) filter 54 for removing nuclear and biological particles, and then to the crew compartment of the vehicle.

The expansion turbine 56, compressor 46, and a cooling fan 62 are all mounted on a common shaft 64 so that the energy extracted from the air exiting the condenser 50, by the expansion turbine, is used to drive the compressor 46 and the fan 62. The cooling fan 62 draws ambient air through the primary and secondary heat exchangers 44,48 and discharges this air back to ambient.

The source of compressed ambient air 20 includes a shaft driven compressor 22 which is driven by any suitable means such as the vehicle's engine, or an electric motor or a hydraulic motor mounted aboard the vehicle. The compressor 22 inducts ambient air, compresses it to about 53 psia, and heats it to a temperature of about 450° F. for an ambient air temperature of 125° F. To maintain a constant 450° F. discharge temperature, a thermocouple 24 mounted downstream of the compressor 22 senses the compressor exit air temperature and when it falls below 450° F signals a modulating valve 26 to open and divert a portion of the hot air discharged by the cooling fan 62 to the inlet of the compressor 22 where it is mixed with the ambient air until the compressor discharge temperature returns to 450° F.

Disposed downstream of the compressor 22 and upstream of the venturi 42 is the catalytic filter or reactor 12. In this position the catalytic filter is always receiving a high pressure and high temperature air. The constant high pressure minimizes the size of the filter, while the constant high temperature ensures proper catalytic action independent of changes in ambient conditions and changes in the temperature of the air exiting the fan 62. Within the filter 12, chemical agents are mixed with air and oxidized, thereby altering their chemistry and rendering them harmless. Also, the filter 12 kills the biological agents.

The temperature of the air entering the crew compartment is preferably controlled by bypassing hot supply air from between the venturi 42 and the primary heat exchanger 44 to just upstream of the HEPA filter 54. The amount of air bypassed is controlled by a modulating valve 58 and a thermocouple 60 disposed immediately downstream of the HEPA filter 54.

Figure 2:
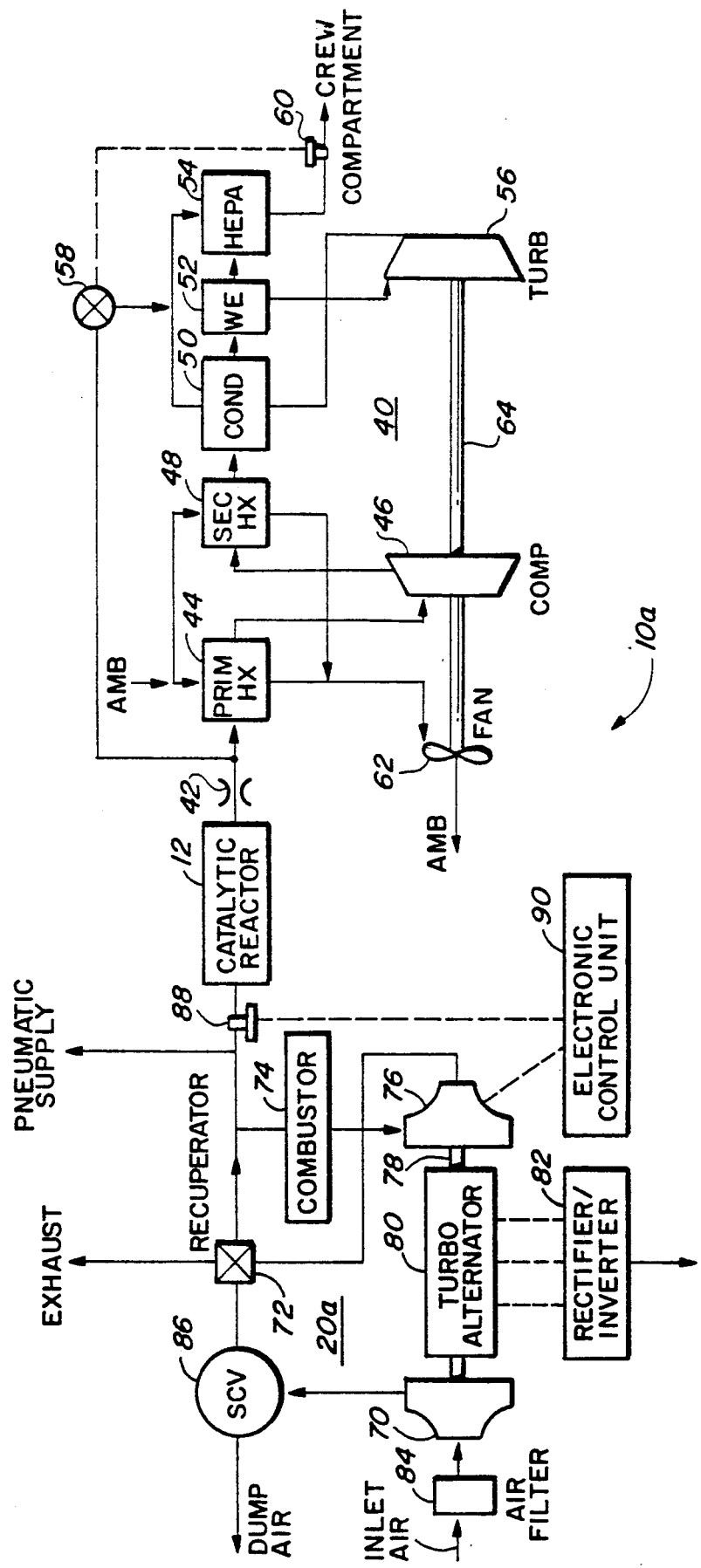
FIG. 2 is a schematic of another embodiment of the environmental control system contemplated by the present invention.

In an alternative embodiment 10a, schematically illustrated in FIG. 2, a source of compressed ambient air 20a is configured as a recuperated turbogenerator comprising in flow series arrangement a compressor 70, a recuperator 72, a combustor 74 and a turbine 76. The compressor 70 and the turbine 76 are both rotatably mounted on a shaft 78. Surrounding the shaft 78 between the compressor 70 and the turbine 76 is a 3-phase alternator winding 80 which generates an AC voltage. A 3-phase rectifier/inverter 82 receives this AC voltage and converts it to DC voltage. To start the source of compressed ambient air 20a, DC voltage is applied to the rectifier/inverter 82 which converts this voltage to 3-phase voltage having a variable frequency that generates a corresponding electro-magnetic force that causes the shaft 78 to rotate.

Air ingested by the compressor 70 first passes through an air filter 84 and is then compressed to a pressure of about 45 psia. This compressed air is then heated in the recuperator 72 to about 700° F. A portion of this compressed, hot air is sent to the catalytic filter 12. The remainder of this air is sent to the combustor 74 where it is mixed with fuel and ignited. The hot gas exiting the combustor 74 is expanded across the turbine 76 which extracts energy from the gas and converts this energy into mechanical energy in the form of the rotating shaft 78. The hot, expanded gas exiting the turbine 76 passes out through the recuperator 72 and then over board. Compressed air can be bled upstream of the catalytic filter 12. A surge control valve 86 is provided to allow the amount bleed air to be rapidly changed without surging the compressor 70.

A thermocouple 88 measures the temperature of the air entering the catalytic filter 12 and sends a signal to an electronic control unit 90 which governs the source of compressed ambient air 20a. Should the temperature measured by the thermocouple 88 drop below 650° F. then the unit 90 either changes the operating condition of the source of compressed ambient air 20a to maintain the 650° F. or sends a signal to the crew compartment indicating that NBC protection is not available, (not shown).

Additionally, the source of compressed air can be configured to include a non-recuperated gas turbine auxiliary power unit, a free piston power unit, or an automotive turbocharger. With each of these devices, the waste heat from the refrigeration unit can be used to heat the inlet air so as to maintain a constant discharge temperature.

Thus, the integrated environmental control system of the present invention is able to filter nuclear, biological, and chemical warfare agents without the efficiency degradation associated with pressure swing adsorbent systems.

Various modifications and alterations to the above described system will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. An integrated environmental control system for providing conditioned air free of nuclear, biological, and chemical warfare agents to the crew compartment of a vehicle, comprising in combination:
   a refrigeration unit;
   a catalytic reactor filter upstream of said refrigeration unit and in fluid communication therewith; and
   means for compressing ambient air and supplying said compressed air to said catalytic filter at a constant temperature regardless of the ambient temperature.

2. The integrated system of claim 1 wherein said refrigeration unit is an air-cycle unit selected from the group consisting of simple cycle, two-wheel bootstrap, and three-wheel bootstrap units.

3. The integrated system of claim 1 further including a particulate air filter.

4. The integrated system of claim 3 wherein said particulate air filter is integrated within said refrigeration unit.

5. An integrated environmental control system for providing conditioned air free of nuclear, biological, and chemical warfare agents to the crew compartment of a vehicle, comprising in combination:
   a refrigeration unit;
   a catalytic reactor filter upstream of said refrigeration unit and in fluid communication therewith;
   an air compressor inducting through an inlet ambient air and supplying pressurized air to said catalytic filter; and
   means for maintaining said pressurized ambient air at a constant temperature regardless of the ambient temperature.

6. The integrated system of claim 5 wherein said refrigeration unit exhausts a flow of hot air.

7. The integrated system of claim 6 wherein said means for maintaining a constant temperature includes means for using a portion of said hot air flow to heat said ambient air at said compressor inlet.

8. The integrated system of claim 7 wherein said means for using a portion of said hot air flow includes a conduit in fluid communication with said hot air flow and said compressor inlet, a thermocouple for measuring the temperature of said compressed air, and a control valve for controlling the amount of hot gas passing therethrough in response to a signal from said thermocouple.

9. An integrated environmental control system for providing conditioned air free of nuclear, biological, and chemical warfare agents to the crew compartment of a vehicle, comprising in combination:
  a refrigeration unit exhausting hot air;
  a catalytic reactor filter upstream of said refrigeration unit and in fluid communication therewith; and
  a compressor driven by said vehicle ingesting ambient air through an inlet and exhausting pressurized air through an outlet;
  a first conduit fluidly communicating said compressor outlet with said catalytic reactor;
  a second conduit fluidly communicating said hot air with said compressor inlet;
  a control valve disposed on said second conduit for controlling the flow hot air to said compressor inlet; and
  a thermocouple disposed in said first conduit and electrically coupled to said control valve, whereby said control valve passes a sufficient flow of said hot gas to said compressor inlet to maintain a constant air temperature, as measured by said thermocouple, at said catalytic filter regardless of the ambient temperature.

10. The integrated system of claim 9 wherein said refrigeration unit includes a high efficiency particulate air filter.

11. An integrated environmental control system for providing conditioned air free of nuclear, biological, and chemical warfare agents to the crew compartment of a vehicle, comprising in combination:
  a refrigeration unit;
  a catalytic reactor filter upstream of said refrigeration unit and in fluid communication therewith; and
  a bleedable, recuperated turbogenerator disposed between ambient and said catalytic filter;
  a conduit for communicating pressurized, recuperated air from said turbogenerator to said catalytic filter;
  an electronic control unit for controlling the operation of said turbogenerator; and
  a thermocouple disposed in said conduit and electrically coupled to said control unit, whereby the the temperature of said pressurized, recuperated air is held constant by altering the operating point of said turbogenerator.

12. The integrated system of claim 11 wherein said refrigeration unit includes a high efficiency particulate air filter.

13. A method for providing breathable air to the crew compartment of a vehicle operating in an ambient environment where the air is contaminated with nuclear, biological, or chemical warfare agents, comprising the steps of:
  ingesting said contaminated air;
  compressing said contaminated air to a constant temperature regardless of the temperature of said ambient environment;
  catalyzing said compressed, contaminated air;
  conditioning said catalyzed air;
  filtering said conditioned air; and
  delivering said filtered air to said crew compartment.

14. A method for providing breathable air to the crew compartment of a vehicle operating in an ambient environment where the air is contaminated with nuclear, biological, or chemical warfare agents, comprising the steps of:
  ingesting and compressing said contaminated ambient air;
  catalyzing said compressed air;
  cooling said catalyzed air by passing it through a first heat exchanger that uses ambient air as a heat sink;
  compressing said cooled air;
  cooling said air again by passing it through a second heat exchanger that uses ambient air as a heat sink;
  cooling and condensing water out from said air;
  extracting said water;
  expanding said air;
  heating said air to a comfortable room temperature;
  filtering said air in a high efficiency particulate filter; and
  delivering said filtered air to the crew compartment.

15. The method of claim 14 further including the steps of:
  exhausting said heated ambient air used as said heat sinks for said first and second heat exchangers;
  measuring the temperature of said compressed air prior to catalyzing; and
  mixing a portion of said exhausted, heated air with said ambient air prior to ingesting, in response to said measured temperature, to maintain a constant temperature of said compressed air prior to catalyzing.

16. The method of claim 15 further including the steps of:
  measuring the temperature of said filtered air before it is delivered to said crew compartment; and
  bypassing a sufficient amount of hot catalyzed air to just upstream of said filtering in response to said measured temperature to maintain said air delivered to said crew compartment at a comfortable room temperature.

17. A method for providing breathable air to the crew compartment of a vehicle operating in an ambient environment where the air is contaminated with nuclear, biological, or chemical warfare agents, comprising the steps of:
  operating a bleedable, recuperated turbogenerator in an environment having air contaminated with nuclear, biological, or chemical warfare agent;
  bleeding compressed and recuperated contaminated air from said turbogenerator;
  catalyzing said contaminated air;
  cooling said air by passing it through a first heat exchanger that uses ambient air as a heat sink;
  compressing said air;
  cooling said air again by passing it through a second heat exchanger that uses ambient air as a heat sink;
  cooling and condensing water out from said air;
  extracting said water;
  expanding said air;
  heating said air to a comfortable room temperature;
  filtering said air in a high efficiency particulate filter; and
  delivering said filtered air to the crew compartment.

18. The method of claim 17 further including the steps of:
  measuring the temperature of said compressed and recuperated contaminated air prior to catalyzing; and adjusting the operating point of said turbogenerator, in response to said measured temperature, to maintain a constant temperature of said compressed and recuperated contaminated air.

19. The method of claim 18 further including the steps of:

measuring the temperature of said filtered air before it is delivered to said crew compartment; and bypassing a sufficient amount of hot catalyzed air to just upstream of said filtering in response to said measured temperature of said filtered air to maintain said air delivered to said crew compartment at a comfortable room temperature.

* * * * *